US009169738B2

(12) United States Patent
Schlienger et al.

(10) Patent No.: US 9,169,738 B2
(45) Date of Patent: Oct. 27, 2015

(54) SHAFT SEAL

(75) Inventors: Joel Schlienger, Zürich (CH); Matthias Kies, Regensburg (DE); Patrick Aberle, Untersiggenthal (CH); Gerd Mundinger, Wettingen (CH)

(73) Assignee: ABB TURBO SYSTEMS AG, Baden (CH)

( * ) Notice: Subject to any disclaimer, the term of this patent is extended or adjusted under 35 U.S.C. 154(b) by 689 days.

(21) Appl. No.: 13/081,897

(22) Filed: Apr. 7, 2011

(65) Prior Publication Data

US 2011/0250067 A1 Oct. 13, 2011

(30) Foreign Application Priority Data

Apr. 9, 2010 (DE) ........................ 10 2010 003 796

(51) Int. Cl.
*F16J 15/54* (2006.01)
*F01D 11/00* (2006.01)

(52) U.S. Cl.
CPC .......... *F01D 11/003* (2013.01); *F05D 2220/40* (2013.01)

(58) Field of Classification Search
CPC ..................................................... F01D 11/003
USPC ........... 415/110, 111, 112, 229, 230; 417/407
See application file for complete search history.

(56) References Cited

U.S. PATENT DOCUMENTS 3,180,568 A 4/1965 Oettle
3,565,497 A 2/1971 Miller
3,778,194 A * 12/1973 Miller et al. .................. 417/407
4,157,881 A * 6/1979 Kasuya ......................... 417/407

(Continued)

FOREIGN PATENT DOCUMENTS

CH 661964 A5 8/1987
DE 2025125 A1 11/1970
DE 3021349 A1 1/1981

(Continued)

OTHER PUBLICATIONS

Office Action issued by the Korean Patent Office on Sep. 28, 2012, in the corresponding Korean Patent Application No. 10-2011-0030379, and an English Translation thereof. (8 pages).

*Primary Examiner* — Nathaniel Wiehe
*Assistant Examiner* — Kayla McCaffrey
(74) *Attorney, Agent, or Firm* — Buchanan Ingersoll & Rooney PC

(57) ABSTRACT

A shaft seal of the rotating wheel shaft of a turbomachine includes a rotating wheel-side seal and a bearing-side seal between the bearing housing and the shaft. An oil outlet chamber is arranged between the rotating wheel-side seal and the bearing-side seal. The oil outlet chamber is delimited by a third seal between the bearing housing and the shaft, and a gas discharge chamber is arranged between the third seal and the rotating wheel-side seal. The construction is actively cooled by means of at least one splash oil bore in the region of the oil drain channel, as a result of which coking of the shaft seal can be prevented. The third seal separates the oil issuing from the oil outlet chamber from the gas issuing from the gas discharge chamber.

23 Claims, 3 Drawing Sheets

(56) References Cited

U.S. PATENT DOCUMENTS

| | | | | |
|---|---|---|---|---|
| 4,196,910 | A | 4/1980 | Aizu | |
| 4,268,229 | A | 5/1981 | Berg | |
| 4,389,052 | A | 6/1983 | Shimizu et al. | |
| 4,447,062 | A | 5/1984 | Leicht | |
| 4,523,763 | A | 6/1985 | Asano et al. | |
| 4,865,332 | A | 9/1989 | Ruetz | |
| 5,890,881 | A * | 4/1999 | Adeff | 417/407 |
| 2005/0188694 | A1 | 9/2005 | Frankenstein | |

FOREIGN PATENT DOCUMENTS

| | | | |
|---|---|---|---|
| DE | 3737932 | A1 | 5/1989 |
| DE | 4330380 | A1 | 3/1995 |
| DE | 19713415 | A1 | 11/1997 |
| DE | 102004055429 | B3 | 8/2006 |
| EP | 1860299 | A1 | 11/2007 |
| JP | 58-51027 | | 4/1983 |
| JP | 61-202649 | | 12/1986 |
| JP | 7-150961 | | 6/1995 |

* cited by examiner

Prior Art

SHAFT SEAL

RELATED APPLICATIONS

This application claims priority under 35 U.S.C. §119 to European Patent Application No. 102010003796.6 filed in Europe on Sep. 4, 2010, the entire content of which is hereby incorporated by reference in its entirety.

FIELD

The present disclosure relates to the field of turbomachines. More particularly, the present disclosure relates to the field of exhaust gas turbochargers which are exposed to admission of exhaust gases from internal combustion engines. The present disclosure also relates to a shaft seal of such a turbomachine.

BACKGROUND INFORMATION

Exhaust gas turbochargers are known to be used for increasing the power of an internal combustion engine. In such an exhaust gas turbocharger, a turbine is provided in the exhaust gas path of the internal combustion engine, and a compressor is arranged upstream of the internal combustion engine, which is connected to the turbine via a common shaft. With charging of an internal combustion engine by means of an exhaust gas turbocharger, the capacity and therefore the fuel mixture in the cylinders are increased and a noticeable power increase for the engine is thereby gained. Optionally, the energy which is stored within the exhaust gas of an internal combustion engine can be converted into electrical or mechanical energy by means of a power turbine. In this case, instead of a compressor, as in the case of the exhaust gas turbocharger, a generator or a mechanical consumer is connected to the turbine shaft.

An exhaust gas turbocharger is generally constituted by a rotor, a bearing assembly for the shaft, flow-guiding housing sections (compressor housing and turbine housing) and a bearing housing. The rotor includes a shaft, an impeller and a turbine wheel.

Because of the high process pressure in the turbine-side and in the compressor-side flow region, the shaft of the exhaust gas turbocharger is sealed with a suitable sealing concept in relation to the cavity of the bearing housing. The internal pressure in the cavity of the bearing housing usually corresponds to the atmospheric pressure. The gas pressure in the flow passage of the compressor side and turbine side depends, however, upon the current operating point of the exhaust gas turbocharger and at most operating points lies above the pressure in the cavity of the bearing housing. In certain cases, however, a negative pressure is also to be taken into consideration, for example, in partial load operation or at rest.

DE 20 25 125 discloses a turbine-side shaft seal of an exhaust gas turbocharger, which consists of a simple oil-collecting chamber on the turbine side of the radial bearing, and a piston ring with a sealing effect between the shaft and the bearing housing. The bearing oil which issues from the radial bearing splashes onto the outwardly offset and rotating shaft shoulder and, as a result of centrifugal forces, is thrown into the oil-collecting chamber. The bearing oil which is thrown out in this way then flows downwards inside the oil-collecting chamber as a result of the force of gravity and flows back again into the oil circuit of the bearing lubricating system.

For reducing gas leakage from the flow passage through the wheel back space of the turbine into the cavity of the bearing housing, piston rings made of metal, for example, gray cast iron, are generally used. The piston ring under tension is clamped in a radial groove with an axial stop shoulder in the bearing housing. As a counterpart to the piston ring, the rotating shaft is provided with a radial groove, wherein the piston ring is axially trapped inside this groove and radially overlaps the groove. Because of the pressure difference between the exhaust gas pressure and the pressure inside the bearing housing, the piston ring is axially displaced as far as it will go in the direction of the existing pressure gradient inside the groove. As a result of the axial seating of the piston ring on one of the inner surfaces of the groove, this piston ring grinds itself in and seals the bearing housing plenum relative to the exhaust gas flow. For improving the sealing effect, two or more piston rings can also be used, as is disclosed in CH 661 964 A5, U.S. Pat. Nos. 3,180,568, 4,196,910 or EP 1 860 299, for example. In these documents, it is shown how the sealing effect against the hot exhaust gases can be increased by means of the additional use of sealing air or deaeration of the space between the two piston rings, and consequently how escape of the exhaust gases into the bearing housing can be totally prevented.

DE 37 37 932 A1 discloses a turbine-side shaft seal of an exhaust gas turbocharger, in which the oil outlet from the radial bearing is provided between the bearing point and the two piston rings. In this case, for improving the oil tightness, an additional centrifugal oil slinger is used instead of a simple axial shaft shoulder. The amount of impinging unwanted bearing oil in the region of the piston ring groove can be significantly reduced as a result. Similarly, in the shaft seals according to U.S. Pat. No. 4,268,229 and also DE 30 21 349, the oil outlet is provided between the radial bearing and the adjacent piston ring, wherein the oil outlet still consists of a chamber. In addition, the cavity between the two piston rings is connected by means of an additional connecting passage to the cavity of the bearing housing and aerated to atmospheric ambient pressure. The resulting pressure difference across the left-hand piston ring is consequently prevented so that the piston ring predominantly undertakes an oil-sealing but not hot-gas sealing function. Therefore, only the right-hand piston ring undertakes the sealing between the pressurized flow passage and the cavity of the bearing housing. As a result of these construction variants, two separate outlets are therefore created for the media of oil (from the radial bearing) and also exhaust gas (from the flow passage), wherein the outlets are separated by means of a piston ring. The lubricating oil which issues from the radial bearing possibly splashes axially into the piston ring region of the gas seal and in the most unfavorable case floods the entire piston ring groove. The gas pressure in the flow passage of a compressor or a turbine is generally greater than the internal pressure in the bearing housing of the turbocharger. Thus, a positive pressure difference (pressure in the flow passage is higher than in the cavity of the bearing housing) results in the ensuing gas leakage blowing through the piston ring seal, and the bearing oil which has inadvertently penetrated into the piston ring region is carried back into the oil-collecting chamber of the bearing housing.

DE 10 2004 055 429 B3 discloses a sealing device for a lubricated bearing of a rotor shaft, which seals a bearing housing of a turbocharger against a supplied lubricating oil in the axial direction. Provision is made on the rotor shaft for a first seal in the form of a gap, a labyrinth or a piston ring, and for a second seal in the form of a narrow gap or a labyrinth, which between them include an oil outlet passage which extends annularly around the circumference of the rotor shaft and is constructed by means of a housing-side oil outlet groove and a shaft-side oil outlet groove which is arranged in an axially aligned position. Provision is made in the oil outlet passage for an annular sealing web which, in the radial direction of the rotor shaft, projects by one end freely into the annular oil outlet passage, and which constitutes a barrier acting in the axial direction for the lubricant which penetrates into the oil outlet passage and radially overlaps the gap of the second seal.

DE 43 30 380 A1 discloses an exhaust gas turbocharger which includes a two-section bearing housing in which oil for cooling is splashed from a first section onto the surface of the second section.

In the case of the above-described turbine-side shaft seal concepts, under certain circumstances there is the risk that hot gases from the wheel back space of the exhaust gas turbine escape through the piston ring seal, and that the bearing oil which remains in the piston ring region and also in the oil outlet grooves locally burns and consequently creates serious coking of the shaft seal and wear associated therewith. The risk of coking increases with rising exhaust gas temperature and with increased gas leakage through the piston rings and also with poorer component cooling. Thus, active cooling of this sealing section is desired for the operational reliability of the shaft seal.

DE 197 13 415 A1 discloses an exhaust gas turbocharger which has, in the region of a thrust bearing at the rear of the impeller, an annular sealing plate as an oil splash guard.

US2005/0188694 discloses an exhaust gas turbocharger which has, between two piston rings in the region of the shaft seal at the rear of the impeller, an oil suction pipe by means of which the zone between the two piston rings is cleaned of possibly penetrating oil by means of a vacuum pump.

U.S. Pat. No. 4,523,763 discloses an exhaust gas turbocharger which, in the region of the shaft seal at the rear of the impeller, has a labyrinth seal to prevent oil from the lubrication circuit being able to reach the operating chamber of the compressor.

SUMMARY

An exemplary embodiment of the present disclosure provides a shaft seal of a shaft, supported in a bearing housing, of a turbomachine between a cavity in the bearing housing and a wheel back space of a rotating wheel of the turbomachine. The exemplary shaft seal of the shaft includes a rotating wheel-side seal between the bearing housing and the shaft, a bearing-side seal between the bearing housing and the shaft, and an oil outlet chamber between the rotating wheel-side seal and the bearing-side seal. The oil outlet chamber is delimited by a third seal between the bearing housing and the shaft. In addition, the exemplary shaft seal includes a gas discharge chamber arranged between the third seal and the rotating wheel-side seal, an oil drain channel arranged into the bearing housing radially outside the oil outlet chamber, and at least one oil splashing device arranged in the region of the oil drain channel for the region of the oil drain channel to be splashed with oil.

An exemplary embodiment of the present disclosure provides a turbomachine which includes at least one rotating wheel arranged on a shaft, a bearing housing in which the shaft is rotatably supported, and a shaft seal arranged between the bearing housing and the shaft. The exemplary shaft seal includes a rotating wheel-side seal between the bearing housing and the shaft, a bearing-side seal between the bearing housing and the shaft, and an oil outlet chamber between the rotating wheel-side seal and the bearing-side seal. The oil outlet chamber is delimited by a third seal between the bearing housing and the shaft. The exemplary shaft seal also includes a gas discharge chamber arranged between the third seal and the rotating wheel-side seal, an oil drain channel arranged into the bearing housing radially outside the oil outlet chamber, and at least one oil splashing device arranged in the region of the oil drain channel for the region of the oil drain channel to be splashed with oil.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
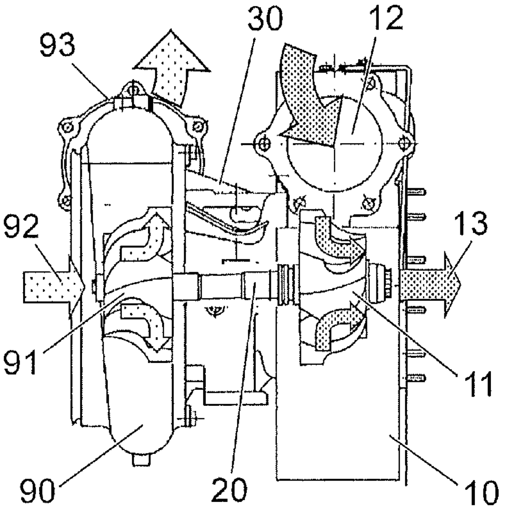
FIG. 1 shows a partially opened-up view of a known exhaust gas turbocharger with a radial compressor and a radial turbine.

Exemplary embodiments of the present disclosure provide a shaft seal of a shaft—supported in a bearing housing—of a turbomachine, in which the draining behavior of the lubricating oil is improved and the risk of coking of the piston ring seal is minimized by means of active cooling of the sealing section.

According to an exemplary embodiment of the present disclosure, the shaft seal, which is supported in a bearing housing, of a turbomachine between a cavity in the bearing housing and a wheel back space of a rotating wheel of the turbomachine, includes multiple seals. A first, rotating wheel-side seal can be designed in the form of at least one piston ring, for example, and a second, bearing-side seal can be designed in the form of a sealing gap, for example, between the bearing housing and the shaft. Arranged between the rotating wheel-side seal and the bearing-side seal is an oil outlet chamber which is delimited by a third, center seal, which is designed in the form of a sealing gap, for example, between the bearing housing and the shaft. Moreover, according to an exemplary embodiment of the present disclosure, a gas discharge chamber is arranged between the third seal and the first, rotating wheel-side seal. The third seal, according to an exemplary embodiment, cleanly separates the two media consisting of oil issuing from the oil outlet chamber from the gas issuing from the gas discharge chamber, as a result of which the risk of coking in the oil outlet chamber can be minimized since the two media do not meet each other inside the same collecting chamber. The two media, as a result of the third seal, are discharged separately from each other sideways into the bearing housing plenum through at least two outlet passages. According to an exemplary embodiment, the shaft seal is actively cooled by means of at least one obliquely oriented oil-splashing device, wherein no oil should find its way into the outlet chambers. The shaft seal is constructionally designed so that splashed oil minimizes as much as possible the material temperatures of the bearing housing and also of the optional insert piece and the piston rings installed therein, and prevents coking of the oil in the various outlet chambers.

According to an exemplary embodiment, the region of the bearing housing which is part of the shaft seal designed according to the present disclosure can be designed as an insert piece. The insert piece can easily be replaced in the case of operation-induced wear, or else can be temporarily removed from the bearing housing for cleaning purposes, for example. Moreover, a material with a heat conductivity quality which is as high as possible can be selected as the material for this insert piece.

According to an exemplary embodiment, the region of the shaft which is part of the shaft seal designed according to the present disclosure and by its contour together with the bearing housing forms the oil outlet chamber, and the gas discharge chamber can be designed as a sleeve-form attachment which co-rotates with the shaft. This attachment can be shrunk or screwed onto the shaft or connected in another way to the shaft in a form-fitting or frictionally engaging manner. The attachment can be optionally produced from a material which, as compared with the material of the shaft, has an improved heat conductivity or an increased insulating effect. In this way, potential oil coking in the oil drain channels can be prevented.

FIG. 1 shows a known exhaust gas turbocharger with a radial compressor 90 and a radial turbine 10. The housing of the depicted exhaust gas turbocharger is shown partially opened up to more clearly depict the rotor with the impeller 91, the shaft 20 and the turbine wheel 11. Thick arrows are used to indicate the air routing from the air inlet 92 via the impeller 91 to the air outlet 93 as well as the gas routing from the gas inlet 12 via the turbine wheel 11 to the gas outlet 13. The shaft 20 is rotatably supported in the bearing housing 30 by means of two radial bearings and at least one thrust bearing.

Figure 2:
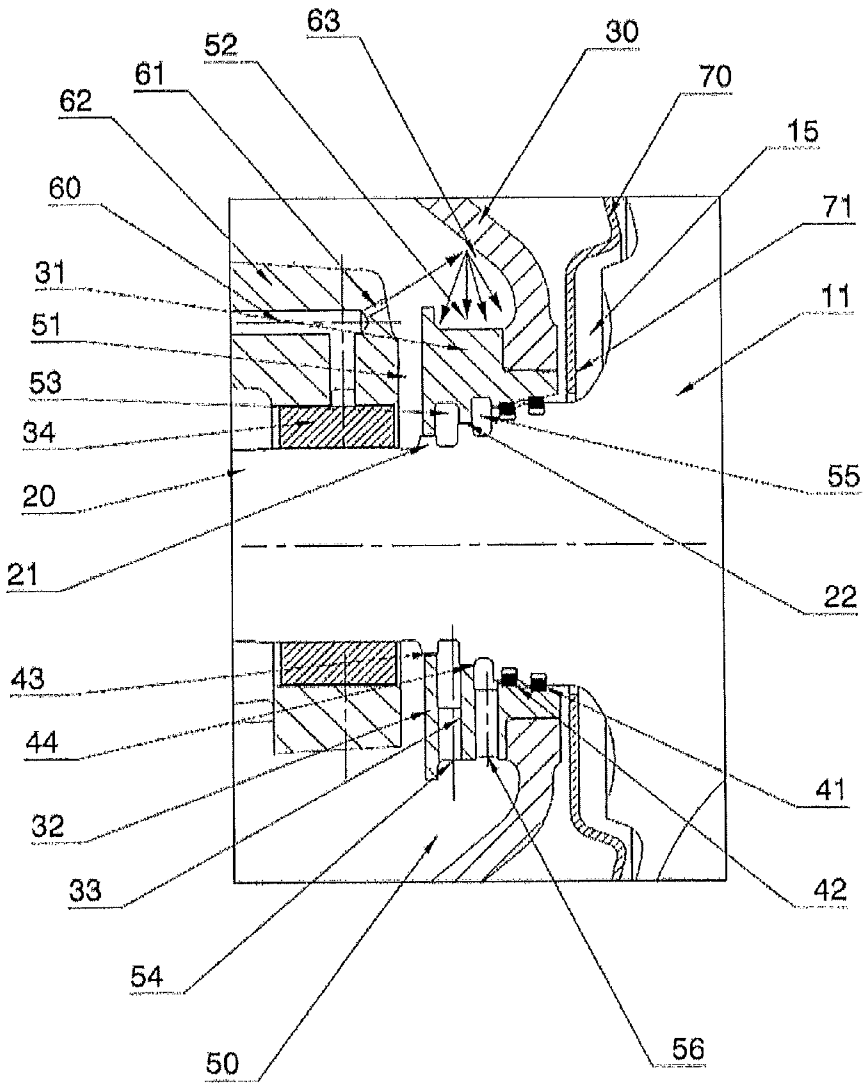
FIG. 2 shows a section directed along the shaft through a turbine-side shaft seal, according to an exemplary embodiment of the present disclosure, of an exhaust gas turbocharger according to FIG. 1.

FIG. 2 shows in an enlarged view an exhaust gas turbocharger or a power turbine in the region of the turbine-side radial bearing 34, according to an exemplary embodiment of the present disclosure. Arranged on the turbine side of this radial bearing (in the view to the right of it in the example of FIG. 2) is the shaft seal which, according to an exemplary embodiment of the present disclosure, is formed in three parts and separates the cavity 50 in the bearing housing from the wheel back space 15 of the turbine wheel 11. In the depicted embodiment of the shaft seal, the bearing housing, in the region of the shaft seal, includes an insert piece 31 (sealing bush) which is realized as a separate component. The insert piece 31 is of an annular design and includes a radially outer oil drain channel 52 for the splash oil which is thrown radially outwards from the radial bearing 34 and discharged to the side. The insert piece 31 is splashed directly or indirectly with splash oil and actively cooled as a result. The splash oil is directed by means of the oil-splashing device 61 onto the components which are to be cooled. The supply with splash oil is carried out by means of the oil passage 60 in the turbine-side bearing flange 62. The oil-splash device 61 in the depicted exemplary embodiment is constructed and oriented as a bore in such a way that the splash oil impinges upon the inner contour 63 in the region of the bearing housing 30 and wets the insert piece in the region of the oil drain channel 52. As a result of the splash oil and the oil from the bearing 34 and oil drain channel 51, the insert piece and the piston rings, seals and outlet chambers located therein are comprehensively cooled and largely prevent coking. For increasing the cooling effect upon the piston rings and outlet chambers, the insert piece 31 can optionally be produced from a material with a heat conducting quality which is as high as possible. In addition, the components of the shaft seal 31, 30, 41, 42 can be separated from the hot turbine rear wall 11 and wheel back space 15 by means of an additional heat shield 70. The heat shield 70 is arranged in the region of the wheel back space 15 between the hot turbine rear wall 11 and the insert piece 31 of the shaft seal. According to an exemplary embodiment, the heat shield bears on the insert piece 31 by a contact surface 71 in the radial inner region. As a result of this heat shield 70, the material temperatures in the region of the insert piece 31 and piston rings 41, 42 are reduced in addition, which again minimizes the tendency towards coking. The oil drain channel 52 is delimited in the axial direction by a radially extended sealing plate 32 which in turn is itself cooled by means of the oil in the outlet passage 54. The insert piece additionally comprises recesses for accommodating two piston rings 41 and 42 arranged in series. In the radially inner region, the insert piece additionally includes an oil outlet chamber 53, a separate gas discharge chamber 55 for the gas leakage from the two piston rings 41 and 42, and a sealing web 33 which separates the oil outlet chamber 53 and the gas discharge chamber 55 from each other.

The oil drain channel 51 between the radial bearing 34 and the sealing plate 32 forms the first main outlet passage of the bearing oil which issues from the radial bearing. The sealing plate 32, together with a radially opposite first step 21 of the shaft 20, forms a first radial sealing gap 43, on account of which a penetration of bearing oil from the oil drain channel 51 into the oil outlet chamber 53 is minimized. The rotating shaft contour of the oil outlet chamber 53 is provided with a radially inwardly offset outlet groove, as a result of which two spray edges are formed inside the oil outlet chamber 53 on the left and right of this groove. The oil which is thrown by means of the spray edges into the radially outer region of the oil outlet chamber 53, which is formed by the groove in the insert piece 31, flows downwards on account of the force of gravity inside the oil outlet chamber 53 along the contour of the insert piece 31. The oil outlet chamber 53 has at least one oil outlet passage 54 in the lower region so that the bearing oil from the oil outlet chamber 53 can be fed to the oil circuit of the bearing lubricating system.

According to an exemplary embodiment, the insert piece 31 of the shaft seal can be characterized by a gas discharge chamber 55 which is arranged next to the oil outlet chamber 53 and is separated from the oil outlet chamber 53 by means of an encompassing sealing web 33. The annularly formed gas discharge chamber 55 is used for collecting the hot gas which flows through the piston rings 41 and 42. The sealing web 33 together with a radially opposite second web 22 of the shaft 20 forms a second radial sealing gap 44. According to an exemplary embodiment of the present disclosure, the sealing gap 44 cleanly separates the two media including the oil issuing from the oil outlet chamber 53 from the gas issuing from the gas discharge chamber 55. The gas which is collected in the gas discharge chamber 55 is in turn transferred into the common volume of the cavity 50 in the bearing housing by means of at least one separate gas outlet passage 56 inside the insert piece 31 and separated from the oil outlet passage 54. As a result of the specific separation of the two outlets, mixing of the two media in the region of the oil outlet chamber 53 should be prevented and consequently the risk of coking in the seal assembly should be reduced. Moreover, as a result of the large oil drain channel 51 and of the first sealing point 43, the main portion of the bearing oil which issues from the radial bearing 34 is discharged outwards and via the oil drain channel 52 is kept away from the piston ring section.

Figure 3:
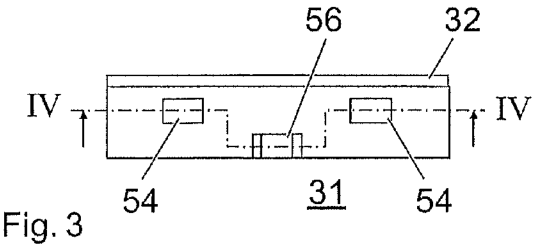
FIG. 3 shows a view from below a housing section of an exemplary embodiment of the shaft seal according to FIG. 2.
Figure 4:
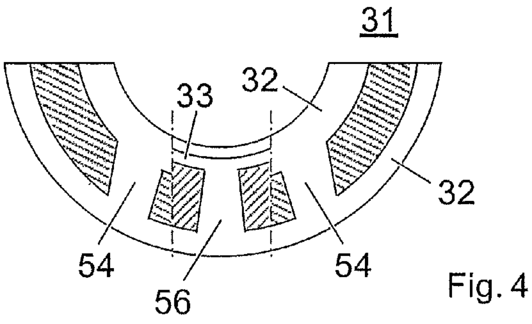
FIG. 4 shows a section directed along IV-IV through the housing section according to FIG. 3.

According to an exemplary embodiment, the exits of the at least one oil outlet passage 54 and of the gas outlet passage 56 can be arranged in an offset manner in the circumferential direction, as is shown in FIG. 3 and FIG. 4. FIG. 3 shows a view from below of an insert piece 31 without shaft and adjacent housing parts. The openings, which lead out of the insert piece at the bottom, of the two oil outlet passages 54 and of the gas outlet passage 56 are offset axially and especially in the circumferential direction. FIG. 4 shows in the section directed along IV-IV the outlet passages and the radially inwardly projecting sealing plate 32 and also, in the region of the gas outlet passage 56, the similarly radially inwardly projecting sealing web 33. The offset passage exits lead to a greater rigidity of the insert piece.

In the depicted exemplary embodiment, the seals 43 and 44 are constructed as radial sealing gaps. According to an exemplary embodiment, these seals can be supplemented or replaced by piston ring seals or other sealing elements.

According to an exemplary embodiment, the bearing housing can be designed without a separate insert piece in the region of the shaft seal designed according to the present disclosure. In this case, the corresponding grooves, sealing plates and sealing webs are incorporated directly into the bearing housing. Compared with the variant of one-piece design without a separate insert piece, the exemplary embodiment with the separate insert piece has the advantage that the insert piece can be produced from a material with good heat conductivity (Ck45, for example) for the purpose of cooling the sealing section and is therefore independent of the material (GGG-40, for example) which is used for the bearing housing. In addition, an insert piece is easy to replace in the case of operation-induced wear, or else easy to temporarily remove from the bearing housing for cleaning purposes, for example.

Figure 5:
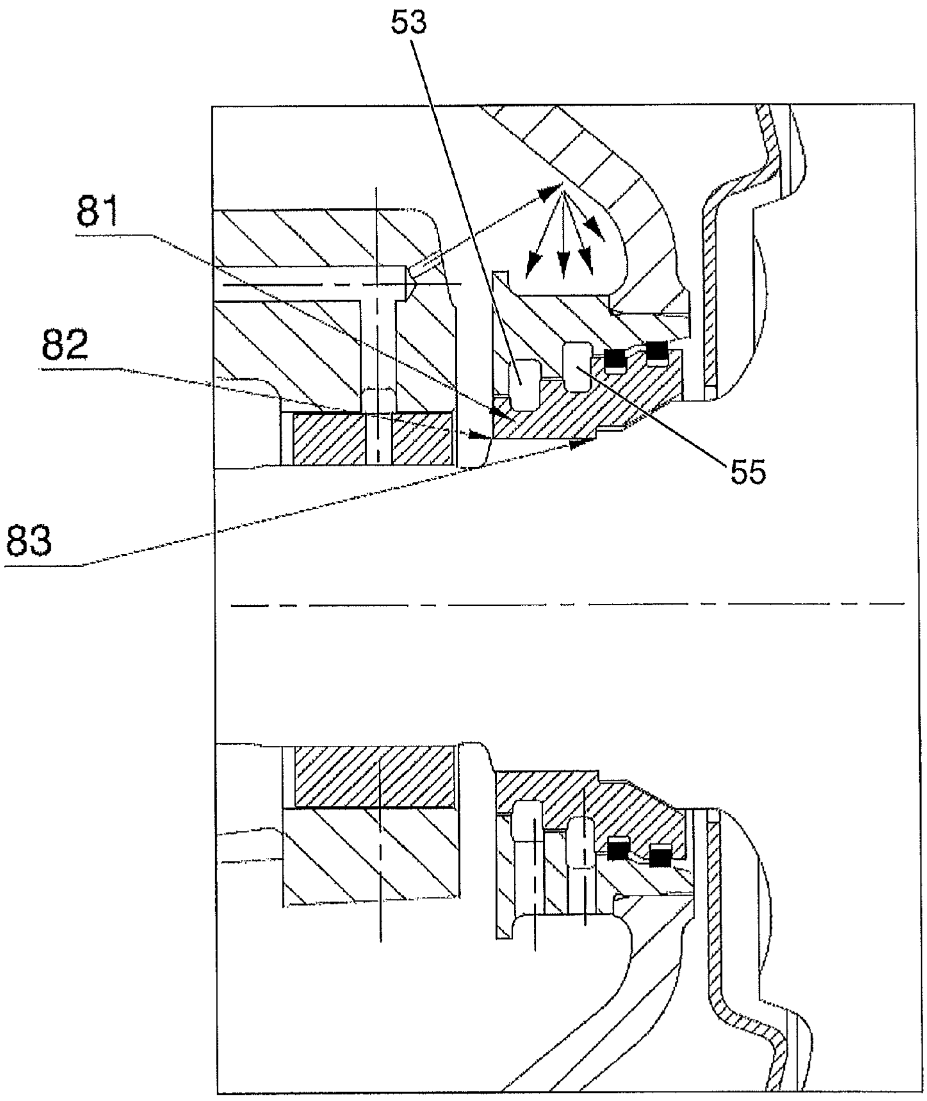
FIG. 5 shows the shaft seal according to FIG. 2 with an attachment shrunk on the shaft.

According to an exemplary embodiment illustrated in FIG. 5, the rotating shaft contour of the turbine can be constructed by means of a sleeve-like attachment 81 in the region of the shaft seal designed according to the present disclosure. The attachment 81 is shrunk onto a seat 82 on the shaft and an edge which is formed on the shaft serves as an axial stop 83 for the attachment 81. The attachment 81 and the shaft seat 82 are designed so that the heat discharge is maximized via the oil cooling and the heat transfer is minimized via the shrink seat 82 on the shaft. The attachment 81 is consequently to be produced from a material with good heat conductivity. As a result of cooling the attachment 81, the oil drain channels are also cooled, which again minimizes the risk of coking in the outlet chambers 53 and 55. According to an exemplary embodiment, the attachment 81 can also be fastened in a frictionally engaging and/or form-fitting manner on the shaft in another way, for example by means of a screwed connection (screw thread) between the attachment and the shaft.

In the depicted exemplary embodiment, the shaft seal includes two piston rings 41 and 42. Alternatively, provision may also be made for only one piston ring or provision may be made for additional piston rings in the region of the shaft seal or in other places of the shaft seal.

The exemplary embodiment which is depicted and described in detail shows the shaft seal designed according to the present disclosure on the turbine side of an exhaust gas turbocharger or of a power turbine. Naturally, the shaft seal designed according to the present disclosure can also be similarly used on the compressor side of an exhaust gas turbocharger, or even used in any other turbomachine.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 Turbine
11 Turbine wheel
12 Gas inlet
13 Gas outlet
15 Wheel back space of the rotating wheel
20 Shaft
21, 22 Sealing web
30 Bearing housing
31 Insert piece of the bearing housing
32 Sealing plate
33 Sealing web
34 Radial bearing
41, 42 Piston ring
43, 44 Radial sealing gap
50 Cavity in the bearing housing
51, 52 Oil drain channel
53 Oil outlet chamber
54 Oil outlet passage
55 Gas discharge chamber
56 Gas outlet passage
60 Oil passage
61 Oil splashing device
62 Turbine-side bearing flange
63 Inner contour of the bearing housing
70 Heat shield
71 Contact point
81 Attachment co-rotating with the shaft
82 Shaft seat
83 Axial stop
90 Compressor
91 Impeller
92 Air inlet
93 Air outlet

What is claimed is:

1. A shaft seal of a shaft, supported in a bearing housing, of a turbomachine between a cavity in the bearing housing and a wheel back space of a rotating wheel of the turbomachine, comprising:

a rotating wheel-side seal between the bearing housing and the shaft;

a bearing-side seal between the bearing housing and the shaft, an oil outlet chamber between the rotating wheel-side seal and the bearing-side seal, the oil outlet chamber being delimited by a third seal between the bearing housing and the shaft;

a gas discharge chamber arranged between the third seal and the rotating wheel-side seal;

an oil drain channel arranged into the bearing housing radially outside the oil outlet chamber;

an insert piece integral with the bearing housing and being formed monolithically, the insert piece having an inner contour surface extending between the bearing housing and a flanged end of the insert piece extending radially further than the inner contour surface, the flanged end of the insert piece being delimited by a passageway of the oil drain channel; and at least one oil splashing device constructed as a bore in a flange arranged opposite to and separated from the inner contour surface of the insert piece by the passageway of the oil drain channel, the at least one oil splashing device being arranged in the region of the oil drain channel for injecting oil onto the inner contour surface of the insert piece and splashing the region of the oil drain channel with oil to actively cool the shaft seal.

2. The shaft seal as claimed in claim 1, wherein the insert piece comprises recesses formed therein, the recesses forming the oil outlet chamber and the gas discharge chamber.

3. The shaft seal as claimed in claim 2, wherein the oil outlet chamber and the gas discharge chamber each comprise at least one separate outlet passage.

4. The shaft seal as claimed in claim 3, wherein the at least one outlet passage of the oil outlet chamber and the at least one outlet passage of the gas discharge chamber lead separately from each other into the cavity in the bearing housing.

5. The shaft seal as claimed in claim 4, wherein the at least one outlet passage of the oil outlet chamber and the at least one outlet passage of the gas discharge chamber lead into the cavity in the bearing housing in an offset manner in a circumferential direction.

6. The shaft seal as claimed in claim 5, wherein the shaft, in the region of the shaft seal, comprises an attachment which has a contour which, together with the bearing housing, forms the oil outlet chamber and the gas discharge chamber.

7. The shaft seal as claimed in claim 2, wherein the oil outlet chamber and the gas discharge chamber each comprise a separate outlet passage.

8. The shaft seal as claimed in claim 7, wherein the at least one outlet passage of the oil outlet chamber and the at least one outlet passage of the gas discharge chamber lead separately from each other into the cavity in the bearing housing.

9. The shaft seal as claimed in claim 8, wherein the at least one outlet passage of the oil outlet chamber and the at least one outlet passage of the gas discharge chamber lead into the cavity in the bearing housing in an offset manner in a circumferential direction.

10. The shaft seal as claimed in claim 9, wherein the insert piece has a contour which, together with the bearing housing, forms the oil outlet chamber and the gas discharge chamber.

11. The shaft seal as claimed in claim 1, wherein the insert piece has a contour which, together with the bearing housing, forms the oil outlet chamber and the gas discharge chamber.

12. The shaft seal as claimed in claim 11, wherein the attachment is produced from a material which has higher heat conductivity than a material of the shaft.

13. The shaft seal as claimed in claim 11, wherein the rotating wheel-side seal is in the form of at least one piston ring.

14. The shaft seal as claimed in claim 11, wherein the bearing-side seal is in the form of a sealing gap.

15. The shaft seal as claimed in claim 1, wherein the rotating wheel-side seal is in the form of at least one piston ring.

16. The shaft seal as claimed in claim 1, wherein the bearing-side seal is in the form of a sealing gap.

17. The shaft seal as claimed in claim 1, wherein the third seal is in the form of a sealing gap.

18. The shaft seal as claimed in claim 1, wherein, inside the wheel back space, a heat shield protects the shaft seal from the hot turbine back wall.

19. A turbomachine comprising:

at least one rotating wheel arranged on a shaft;

a bearing housing in which the shaft is rotatably supported; and a shaft seal arranged between the bearing housing and the shaft, wherein the shaft seal includes:

a rotating wheel-side seal between the bearing housing and the shaft;

a bearing-side seal between the bearing housing and the shaft, an oil outlet chamber between the rotating wheel-side seal and the bearing-side seal, the oil outlet chamber being delimited by a third seal between the bearing housing and the shaft;

a gas discharge chamber arranged between the third seal and the rotating wheel-side seal;

an oil drain channel arranged into the bearing housing radially outside the oil outlet chamber;

an insert piece integral with the bearing housing and being formed monolithically, the insert piece having an inner contour surface extending between the bearing housing and a flanged end of the insert piece extending radially further than the inner contour surface, the flanged end of the insert piece being delimited by a passageway of the oil drain channel; and at least one oil splashing device constructed as a bore in a flange arranged opposite to and separated from the inner contour surface of the insert piece by the passageway of the oil drain channel, the at least one oil splashing device being arranged in the region of the oil drain channel for injecting oil onto the inner contour surface of the insert piece and splashing the region of the oil drain channel with oil to actively cool the shaft seal.

20. The turbomachine as claimed in claim 19, wherein the turbomachine is at least one of an exhaust gas turbocharger and a power turbine, and the rotating wheel is a turbine rotating wheel arranged on the shaft.

21. The turbomachine as claimed in claim 19, wherein the turbomachine is an exhaust gas turbocharger, and the rotating wheel is a compressor rotating wheel arranged on the shaft.

22. The turbomachine as claimed in claim 19, wherein the insert piece comprises recesses formed therein, the recesses forming the oil outlet chamber and the gas discharge chamber.

23. The turbomachine as claimed in claim 19, wherein the insert piece has a contour which, together with the bearing housing, forms the oil outlet chamber and the gas discharge chamber.

* * * * *